July 10, 1956

C. L. ISBORN 2,754,430

FERRO-RESONANT RING COUNTER

Filed April 11, 1955

INVENTOR.
CARL L. ISBORN
BY
Lippincott + Smith
ATTORNEYS

July 10, 1956  C. L. ISBORN  2,754,430
FERRO-RESONANT RING COUNTER
Filed April 11, 1955  2 Sheets-Sheet 2

INVENTOR.
CARL L. ISBORN
BY
Lippincott + Smith
ATTORNEYS

2,754,430

FERRO-RESONANT RING COUNTER

Carl L. Isborn, Richmond, Calif., assignor to Beckman Instruments, Inc., Fullerton, Calif., a corporation of California Application April 11, 1955, Serial No. 500,611

13 Claims. (Cl. 307—88)

This invention relates to counting circuits and particularly to ferro-resonant ring counters.

The principle of ferro-resonance is known to the art, being described, for example, in the inventor's article entitled "Ferro-Resonant Flip-Flops" contained on pages 121 to 123 of volume 25, No. 4 of "Electronics" for April 1952.

Ferro-resonant ring counters have as their basic element a bistable ferro-resonant circuit. The prior art circuit comprises a saturable reactor in series with a capacitor, to which series circuit an A. C. voltage is applied. The amplitude and frequency of this applied A. C. voltage are chosen so that the point at which the series circuit resonates is a point at which the saturable reactor or non-linear inductance is partly, but not entirely, saturated. Under these conditions, for a certain range of applied A. C. voltage, the series circuit is bistable, that is, it has two stable conditions, either of which it can maintain indefinitely. One of these states, which may be referred to as a low-current or "off" state, results when the saturable reactor is relatively unsaturated; that is, when the circuit is inductive, and most of the voltage drop is across the saturable reactor. The other state, which may be referred to as the high-current or "on" state, results when the saturable reactor is relatively saturated; that is, when the circuit is capacitative and most of the voltage drop is across the capacitor.

In the prior art ferro-resonant ring counters, a plurality of counting elements, each comprising a bistable ferro-resonant circuit, that is, a saturable reactor and a capacitor in series, as described above, are connected in parallel and the parallel combination connected in series with a limiting capacitance of such a value that under the applied A. C. excitation voltage one, and only one, counting element will be in its high current state and the remaining counting elements will be in their low-current states. Should two or more counting elements attempt simultaneously to be in high-current states, the limiting capacitance will have a voltage drop across it of such a magnitude as to lower the voltage on the parallel combination of counting elements to a point which will extinguish one or the other of such counting elements, leaving only one element in the "on" state.

The saturable reactor in each counting element has a control winding in addition to its operating winding. When this control winding is energized it tends to saturate the saturable reactor and causes the inductance of the windings of that particular saturable reactor to fall to a low value. A bistable counting element contained in a ring of such elements as described which has its control winding energized will move into the "on" or high-current state, provided that the remaining counting elements are simultaneously returned to their "off" or low-current states, since its reactance is less than the other counting elements and it accordingly tends to start saturating due to the increased current flow.

In the prior art the transfer is accomplished by connecting each control winding to the junction of the saturable reactor and the capacitor of the preceding counting element and through a symmetrical non-linear resistance element such as a thyrite unit, to a biasing source. In this manner, when a counting element is in its "on" or high-current state, current flows also through the control winding of the next counting element or through a bypass condenser connected in shunt with the control winding and through the associated non-linear resistance element. The non-linear resistance element will have lower resistance under these conditions and a pulse applied to all the non-linear resistance elements will flow mainly through the non-linear resistance element carrying the higher current. Input pulses are accordingly applied to the common return for the non-linear elements. The path containing the non-linear resistance element which is carrying A. C. current from a preceding counting element in the high current state will offer lowest impedance. A large proportion of the input pulse will accordingly pass through that particular non-linear element path and through the associated control winding, greatly decreasing the inductance of the saturable reactor in the counting element following the counting element which was previously in the high current state. This causes an increase of current in that counting element, and a decrease in voltage across the parallel combination of all the counting elements. Furthermore, the element previously in the high current state is more heavily loaded due to the decreased non-linear element resistance. Under these conditions the counting element which was first in its high-current state tends to return to its low-current state due to the combined effects of the decreased excitation voltage and the damping due to the decreased non-linear resistance. On the other hand, the counting element having the current flow in its control winding tends to go into the high-current state due to the increased current occasioned thereby. Consequently, the subsequent counting element goes into its high-current state while the preceding counting element returns to its low-current state.

The prior art circuits as described hereinabove are subject to a number of serious limitations. For example, as will be apparent to those skilled in the art from the foregoing description, too wide an input pulse results in progression of the high current state around the ring and several counts being recorded. On the other hand, considerable pulse power is needed to lower the inductance of a saturable reactor to a satisfactory value by means of a control winding. Since this pulse power must be applied within the time allowed by the pulse width restrictions, the circuit is sensitive to input pulse voltage and current variations. The aforementioned pulse width restriction also requires a rather high value of pulse voltage to establish the necessary current in the control winding within the time allowable. If more turns are put on the control winding in an effort to decrease the amount of such current required, the inductance of the control winding is increased, and more voltage is required to establish the smaller value of current with the increased inductance in the same amount of time. These effects combine to give serious limitations both as to maximum and minimum pulse width, as well as pulse amplitude.

Another serious limitation in the prior art circuits arises from the fact that non-linear resistance elements often have variations in their characteristics. Where the inherent resistance characteristics of a non-linear element conducting current from a counting element in the high current state as compared with the inherent resistance of a non-linear element conducting the very small current from a counting element in the low current state exceeds the variation in such resistances produced by the current flowing through the particular non-linear resistance element involved in the circuit next to be energized, input pulses result in the wrong counting element being energized. Similarly, a variation in the inherent characteristics of the non-linear resistances may cause a pulse to fail to advance the count.

Another limitation in prior art forms of ferro-resonant ring counters arising from somewhat the same considerations is their sensitivity to asymmetrical loading. If the indicating device draws too much current then just that much less current is available for differentiating between non-linear elements for the gating operation and the non-uniformity of the non-linear resistance elements assumes greater importance. Also, more input pulse power is required with most forms of non-linear resistance elements, since in most such elements the resistance offered is a function of the current.

In the prior art other types of limitations similar to the limitations imposed by asymmetrical loading and non-linear resistance element variation arise from the effect of core loss variation from one saturable reactor to the next, and from the effect of A. C. energizing voltage variations.

Counting rate limitations are partly due to the fact that a sufficient pulse width is needed to establish triggering current which will sufficiently saturate the counting element next to be energized, as was discussed hereinabove. Such pulse width is also needed to supply losses arising from a small amount of conduction in some or all of the remaining non-linear element paths. Furthermore, pulses cannot be too close to each other as idle time is needed for the circuit to return to its stable condition.

An object of the present invention is to provide a counter which overcomes the prior art limitations to a degree which permits great variation in the parameters above-mentioned, and which permits disregard of the effects of such variations for all practical or manufacturing purposes.

A further object of the invention is to provide improved ferro-resonant ring counters which, as compared to prior art forms of ferro-resonant ring counters, have greater tolerance to pulse width and amplitude variations, increased sensitivity to pulse input, vastly greater tolerance to non-linear element variations, less sensitivity to asymmetrical loading, more tolerance to core loss variations from one saturable reactor to the next, more tolerance to A. C. energizing voltage variations, and other advantages, and this object has been realized in the invention herein.

Another object of the invention is to provide a counter which will count several times as fast as other types of ferro-resonant counters.

Another object of the invention is to provide a counter requiring low pulse power wherein the circuits are not sensitive to the input pulse characteristics. This is realized in the invention by virtue of the fact that in most of the embodiments each pulse to be counted need partially saturate only one control winding in an input stage. There are no other paths for the input pulses to follow as in the prior art. Furthermore, input pulses are applied directly to this control winding in the input stage, and do not have to go through a relatively high resistance in series therewith as was the case in the prior art. This is realized in the other embodiments of the invention herein also, for similar reasons.

Further objects of the invention are realized in that much greater tolerance to component variations, such as core loss variations, or non-linear impedance characteristic variations, is possible than in prior art counters, since the circuits containing these components no longer function as gating circuits for the input pulse and in that the counters of the invention are relatively insensitive to asymmetrical loading.

The ring counters herein have the advantages of ferro-resonant counters generally. Due to the reactive nature of the components very little power is necessary. Due to the fact that a complete element is conveniently used for each counting element or stage no indicating matrix, feedback paths, or complex circuits are necessary, and reliability and flexibility are greatly enhanced.

In addition to the advantages of greatly increased reliability and increased commercial feasibility, the invention lends itself to applications not readily accomplished under the prior art. For example, in the embodiments illustrated herein, it is apparent that the other parameters, as for example, the series reactance, or the amplitude or frequency of the applied A. C. voltage, may be varied by some means, and varying numbers of the counting stages triggered into indicating stages in order to accomplish dividing functions, or in order to cause the counting elements to function analogously to a shift register. No change in pulse input in such cases is necessary in the invention, each pulse serving to transfer each indicating state by one element whether one or several counting elements are in the indicating state.

The invention also possesses the advantage of greater flexibility in components. In the memory circuits, almost any type of non-linear impedance may be employed. Even capacitative non-linear elements may be used if of sufficient capacity or if appropriate means are provided for a D. C. bypass. Various forms of saturable reactor may also be used in the counting elements, with the increased tolerances acceptable in the various embodiments of the invention. Variation in the forms and characteristics of the other components are also possible and such variations will readily occur to those skilled in the art from the drawings and description herein.

Throughout this application the words "high current" and "on" will be used interchangeably to indicate a high current state, and the words "low-current" and "off" will be used interchangeably to indicate a low current state, and in the various embodiments of the invention described and claimed herein it will be understood that either the high current or the low current condition may be taken as the indicating condition.

Briefly, the invention hereinafter shown and described involves arranging the circuit associated with the control winding of each saturable reactor in such a manner that it provides a "memory" effect. Pulses to be counted are then introduced in such a manner that each pulse causes the A. C. voltage employed to energize the counting elements to be reduced to a low value or to zero value, allowing the aforementioned "memory" effect to select the counting element or elements next to be in the indicating state upon the reapplication of A. C. energizing power. In the invention the circuits associated with the control winding serve both "memory" and "priming" functions whereas in the prior art these circuits were perhaps best described as "gating" circuits. The circuits associated with the control windings in the invention will be referred to hereinafter as "memory" circuits.

In a preferred embodiment of the invention the memory circuits are connected to a point within each counting element which is so chosen that it has a higher A. C. voltage when the particular counting element is in its indicating state. The memory circuit is also connected through the control winding on the saturable reactor in the next succeeding counting element to a non-linear impedance, although the order of connection is unimportant. In this particular preferred embodiment of the invention a capacitor is connected in parallel or shunt with each control winding to give the desired memory effect and, in addition, if a symmetrical rather than asymmetrical non-linear resistance element is used in the circuit associated with each said control winding the common return of the memory circuits is connected to a substantially constant current source of biasing voltage. The capacitor in the memory circuit following the indicating element will be charged to some D. C. voltage due to the rectifying action of the non-linear impedance. The capacitors in the other memory circuits will not have accumulated such a D. C. charge due to the lack of the higher A. C. voltage.

Upon the introduction of a pulse to be counted, the value of the A. C. energizing voltage across all the counting elements drops to a low value, tending to return all elements to their "off" state. During the absence of the A. C. excitation voltage the memory circuit capacitor will discharge, at least in part, its accumulated charge through the control winding in the memory circuit following the stage which was in its "on" state prior to the introduction of the pulse. Upon the termination of the pulse to be counted, or upon the termination of the effects of said pulse where an input circuit is used which differentiates or otherwise alters the input pulses, the A. C. excitation voltage again rises on the counting elements. The control winding following the counting element which was in the "on" state will still have a D. C. component of current flowing, a capacitor capable of furnishing the requisite current through the control winding for the period of time involved having been chosen. This D. C. component will cause some saturation of the following core, and a lowering of the inductance of the associated counting element winding. The next succeeding counting element will consequently have the lowest firing voltage, said firing voltage being that voltage at which the current suddenly jumps to a high value; hence it will be the next counting element to go into the "on" state.

Employing a memory device and introducing the pulse to be counted so that it temporarily reduces the A. C. exciting voltage on the counting elements permits great increases in the tolerances allowable with respect to the various voltages and current as well as in the various electrical components comprising the counter. A number of alternative circuit arrangements are feasible employing these inventive concepts and a number of such novel circuit arrangements are a part of the invention herein. More particularly, for example, it becomes possible to arrange each counting element so that the saturable reactor and capacitor comprising such counting element are in parallel, as well as arranging such components in series. In the parallel counting element arrangement a third impedance, for example, a capacitance, is preferably connected in series to facilitate sensing the condition of the parallel combination. Also, in the parallel arrangement the high current state, as respects the sensing impedance, preferably becomes the non-indicating state and accordingly, when the control winding of a chosen stage is energized the circuit assumes the low current or indicating state. This is, of course, the reverse of the situation obtaining in the series arrangement described hereinabove.

The memory circuit comprising a capacitance and the control winding, arranged to maintain a D. C. current upon the removal of the A. C. excitation, is a preferred form of memory circuit. However, other types of memory circuits are feasible and intended to be a part of the invention. For example an impedance other than a capacitor may be arranged to store electrical energy and discharge said energy upon the removal of the A. C. excitation, priming the counting element or elements next scheduled to go into their indicating states.

Further objects and advantages of the invention will be apparent to those skilled in the art from the following drawing and description, wherein.

Figure 1:
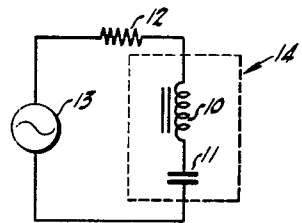
Fig. 1 is a schematic diagram of a single ferro-resonant counting element having a series arrangement.

Referring now to the figures wherein the same numbers are used for the same components throughout and referring particularly to Fig. 1, a series counting element 14 is shown connected through a limiting impedance such as resistor 12 to an A. C. excitation generator 13. Limiting resistor 12 and A. C. generator 13 are shown for convenience only, as any other means of exciting counting element 14 with A. C. may be employed. Counting element 14 is comprised of a saturable reactor 10 connected in series with capacitor 11.

The frequency generated by generator 13 is chosen so that counting element 14 will be series resonant at a value of inductance for inductor 10 which inductor 10 attains near saturation. The amplitude of A. C. excitation voltage furnished by generator 13 is chosen at some value which will not initially cause saturation of saturable reaction 10 but which will maintain the saturated state once it is reached. Under these conditions the counting element 14 is bistable, that is, it has two states either of which it will maintain indefinitely once it is in that particular state.

One of these states, which will hereinafter be referred to as the low current or "off" state, results when the saturable reactor 10 is relatively unsaturated. Under this condition most of the voltage drop appears across saturable reactor 10, as it offers high impedance due to its unsaturated value of inductance. If, however, saturable reactor 10 is caused to become saturated by some means such as, for example, introducing a magnet or causing surrent to flow through a second winding adjacent thereto, the bistable counting element 14 will assume a second state. This state, which will be hereinafter referred to as the high current or "on" state, results when saturable reactor 10 is relatively saturated and assumes a low impedance due to the decrease in its inductance. A. C. excitation voltage furnished by generator 13, as stated above, will maintain the saturated condition of saturable reactor 10 once counting element 14 has reached the high current state. There is one other theoretically possible state for the counting element 14 under excitation by A. C. of the frquency and magnitude which gives bistability. However, the circuit is instable in this state, due to the fact that the series impedance offered by counting element 14 is changing as a result of the saturation of saturable reactor 10 and the counting element offers negative impedance. The current accordingly continues to increase till the high current state is reached.

Figure 2:
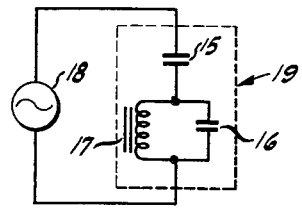
Fig. 2 is a schematic diagram of a single ferro-resonant counting element having a parallel arrangement.

Fig. 2 depicts a counting element in which the operating elements are arranged in parallel connection rather than in the series connection of Fig. 1. In Fig. 2, A. C. excitation generator 18 is connected to counting element 19. Counting element 19 is comprised of saturable reactor 17 in parallel with capacitor 16, and capacitor 15, which is added and connected in series to facilitate sensing the condition of the parallel combination. The amplitude and frequency of the A. C. excitation voltage furnished by generator 19 are preferably chosen so that the parallel combination of saturable reactor 17 and capacitor 16 will be resonant when saturable reactor 17 is nearly saturated.

The circuit of Fig. 2, similarly to the circuit of Fig. 1, is bistable, having two states, either of which it will maintain indefinitely once in that particular state. One such state, which will hereinafter be referred to as the low current state, results when the saturable reactor 17 is nearly saturated, and the parallel resonant circuit made up of saturable reactor 17 and capacitor 16 is at or near resonance. Under these circumstances the parallel portion of the counting element circuit offers very high impedance as compared with sensing capacitor 15 and consequently most of the voltage furnished by A. C. excitation generator 18 appears across saturable reactor 17 and capacitor 16.

The other state, which will hereinafter be referred to as the high current state, results when the saturable reactor 17 is relatively unsaturated, and the parallel circuit comprised of saturable reactor 17 and capacitor 16 is not at or near its resonant frequency. Under these conditions the parallel portion of the circuit offers relatively low impedance as compared with capacitor 15 and, accordingly, most of the A. C. excitation voltage furnished by generator 18 appears across capacitor 15. It will be noted that in this parallel connected counting element 19 of Fig. 2, saturation of saturable reactor 17 causes a low current state, as respects sensing capacitor 15, whereas in the series connected counting element 14 of Fig. 1, saturation of saturable reactor 10 causes a high current state.

Figure 3:
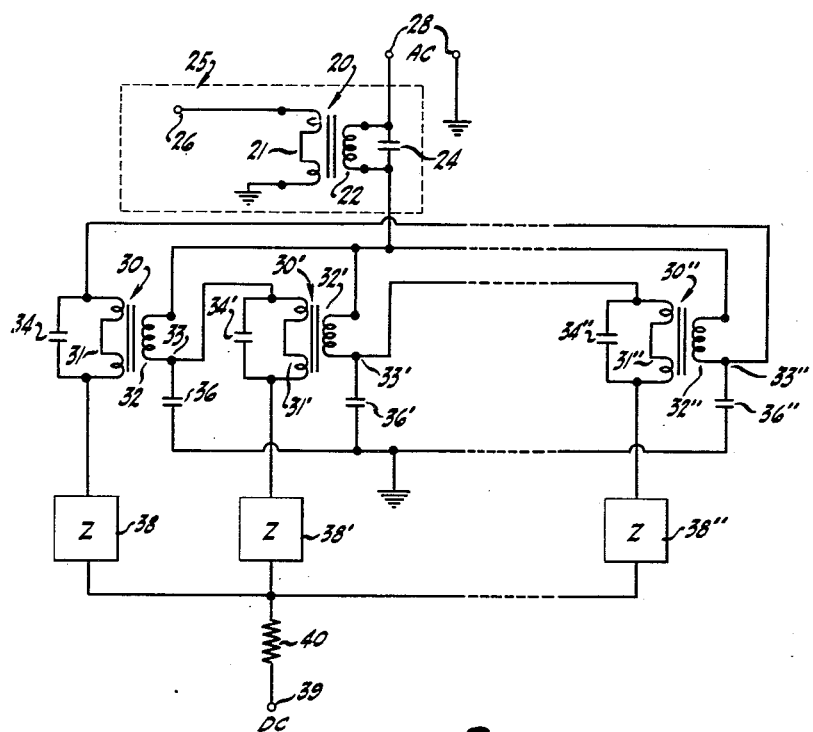
Fig. 3 is a schematic diagram of a preferred embodiment of the invention employing series type counting elements and a series pulse input stage.

Referring now to Fig. 3, a schematic diagram of a preferred embodiment of a complete ferro-resonant ring counter is there illustrated. The counting elements are comprised of an operating winding 32 of saturable reactor 30 in series with a capacitor 36. A second counting element has these components designated respectively by 32' and 36'. Any number of counting elements may be connected in parallel, for example, twenty such elements might be connected in parallel, or only two such elements might be connected in parallel. For convenience, a third counting element with the components designated by 32" and 36" respectively, is shown after an intermediate dotted portion. Connected to a point within each counting element, such as the junction 33 of winding 32 and capacitor 36, is a memory circuit. The memory circuit might be connected to other points, such as a tap on operating winding 32. This memory circuit is comprised of a control winding 31 and a capacitor 34 in parallel and the parallel combination connected through a non-linear impedance element 38. All the counting elements are connected through a limiting impedance such as resistor 40 in series arrangement to a source of D. C. biasing voltage. Non-linear impedance 38 may be any type of non-linear impedance, symmetrical, such as, for example, a heat unit, a varistor, a lamp, a saturable reactor, a dielector, etc., or non-symmetrical, such as, for example, a diode, a neon light, etc. In case non-symmetrical units are used, no biasing D. C. may be necessary and terminal 39 may be grounded. The control winding 31 in each memory circuit is arranged to control the condition of the saturable reactor 30 in the counting element next following the counting element containing the point of connection 33 of the particular memory circuit. This control winding 31 is shown comprised of two windings and these two windings are connected in series opposing to prevent any voltage induced thereon by operating winding 32 from affecting the previous stage. Other arrangements may be used to serve the same purpose, as, for example, only one winding with no bucking arrangement, and an inductance arranged as a radio frequency choke in series with the control winding to prevent interaction. The memory circuits for the other stages of the counter are comprised of capacitor 34' in parallel with control winding 31' and the parallel combination in series with non-linear impedance 38' and of capacitor 34" in parallel with control winding 31", and the parallel combination in series with non-linear impedance 38", etc.

Also depicted in Fig. 3 is preferred form of input stage 25. Input stage 25 is comprised of a saturable reactor 20, having a control winding 21 to which winding the input terminal 26 is connected, and an operating winding 22 connected in parallel with capacitor 24. Capacitor 24 and winding 22 are also in series with the A. C. excitation voltage for the parallel group of counting elements, which A. C. excitation voltage is connected to terminals 28. The parallel combination of winding 22 and capacitor 24 is arranged to offer high impedance when pulsed, and greatly magnify the effects of input pulses, as will be explained hereinafter. It will be understood by those familiar with the art that the input circuit shown may be replaced by other types of input circuits arranged to offer high impedance upon the introduction of pulses, as for example a vacuum tube arranged to cut off upon the introduction of pulses to one of its grids, or a diode arranged to be nonconductive during such pulses.

In the ferro-resonant ring counter of Fig. 3 capacitor 24 is chosen of such a magnitude that the impedance of capacitor 24 and the unsaturated winding 22 limits the A. C. current to a value which will permit only a predetermined number of counting elements to be in their high current state. All other counting elements are necessarily in their low current state. Ordinarily only one counting element will be in the high current state, though in certain applications, such as dividers or shift registers, it may be desirable to have more than one counting element in the high current state. Should more than the predetermined number of counting elements attempt to be in their high current states, capacitor 24 and winding 22 will have an A. C. voltage drop across them of such a magnitude as to tend to extinguish all counting elements, and those counting elements above the predetermined number of counting elements will be returned to their low current states.

Assuming, for example, that the counting element comprised of saturable reactor winding 32 and capacitor 36 is in its high current state, and that all other counting elements are in their low current states, the operation of the circuit of Fig. 3 upon the introduction of a particular pulse to be counted is as follows:

The counting element comprised of winding 32 and capacitor 36, having a high A. C. excitation current through it, will have a higher A. C. voltage at the junction 33 of saturable reactor 32 and capacitor 36 than the other counting elements will have at their corresponding 33', 33" etc. junction points. This relatively high A. C. voltage will cause an A. C. current to flow through control winding 31' and capacitor 34', and through the associated non-linear impedance element 38'. Non-linear impedance 38' has a symmetrical impedance characteristic in the embodiment illustrated in Fig. 3, but due to the effect of D. C. bias voltage connected to impedance 30, said non-linear impedance 38 will have a rectifying action on the A. C. excitation current and will cause a D. C. component of current to flow in control winding 31' and a D. C. voltage to appear across capacitor 34'. The other control windings will have virtually no D. C. current flowing through them since the A. C. voltages appearing at connections 33', 33", etc., are of very small amplitude and do not swing to the non-linear portion of the non-linear impedance characteristic. The D. C. current flowing in control winding 31' results in partial saturation of saturable reactor 30' and a consequent lowering of the inductance of the operating winding 32'. However, the counting element comprised of operating winding 32 and capacitor 36 is already in its high current state and prevents the counting element comprised of saturable reactor operating winding 32' and capacitor 36' from assuming its high current state.

The pulse to be counted may be of either polarity and is applied on terminal 26. This pulse results in the temporary saturation of saturable reactor 20, due to the current through control winding 21. The saturation of saturable reactor 20 causes a lowering of the inductance of operating winding 22 to the point where it resonates at the A. C. excitation frequency with capacitor 24, and the parallel resonant circuit so comprised offers a very high impedance to the A. C. excitation voltage being introduced on terminals 28. It will be noted that this arrangement greatly amplifies or magnifies the effect of the input pulses. Substantially all of the A. C. excitation voltage appears across capacitor 24 and saturable reactor winding 22 and very little of the A. C. excitation voltage appears across the parallel counting elements. The counting element comprised of winding 32 and capacitor 36 accordingly tends to return to its low current state, and this effect is aided by the damping effect occasioned by the decreased impedance in the associated memory circuit as described below.

During the time the A. C. excitation voltage is of a low value on the counting elements, capacitor 34' discharges through control winding 31', maintaining a D. C. current through said control winding 31'. The preferred arrangement is to have capacitor 34' of a sufficient size so that it will maintain the current through winding 31' during any pulse that may be encountered, and this is easily accomplished with the control windings ordinarily employed. In such embodiments, the parallel circuit comprised of control winding 31' and capacitor 34' is preferably of low Q, and the current decays rapidly, preferably being maintained for only one-quarter cycle of the natural oscillatory frequency of winding 31' and capacitor 34', in order to give rapid recovery time.

In the preferred embodiment, the D. C. current flowing in control winding 31' results in a lowering of the inductance of operating winding 32', and consequently the counting element comprised of operating winding 32' and capacitor 36' will have a lower firing voltage than the other counting elements not similarly energized.

Upon the termination of the pulse to be counted, the saturable reactor 20 becomes unsaturated, and operating winding 22 resumes its former or unsaturated inductance value. The parallel circuit comprised of operating winding 22 and capacitor 24 is no longer parallel resonant at the A. C. excitation frequency, its impedance drops, and the A. C. voltage across it decreases. Consequently, the A. C. excitation voltage on the parallel group of counting elements rises, and one counting element must go into its high current state. The counting element which will go into its high current state will be counting element comprised of operating winding 32' and capacitor 36'.

In a similar manner, further pulses introduced upon terminal 26 will cause the high current or indicating condition to progress around the ring. Any convenient means may be employed to give indication of the count, such as neon lamps which are conveniently connected to junctions 33, 33', etc.

It will be noted from the above discussion that a pulse of extremely short duration may be counted, the only requirement being that it have enough energy to cause a sufficient temporary saturation of saturable reactor 20. On the other hand, a pulse to be counted may be of considerable duration, the limiting factor in this direction being the storing capacity of the parallel circuit made up of control winding 31' and capacitor 34'. The pulses to be counted may accordingly vary greatly in their characteristics. The order of improvement in the variation of pulse width allowable this particular embodiment over the variation in pulse width allowable in the prior art circuit described hereinabove is more than 10 to 1. It should be noted also that the pulse introduced on 26 need saturate only saturable reactor 20, and has no other paths for losses as in the prior art. Consequently, pulses to be counted may be of smaller magnitude than was formerly possible. Other advantages already detailed are also realized.

The usual form of indicating device is neon lamps connected between terminals 33 in each counting element and ground or a source of potential. However, the permissible component variations are so great in this embodiment that many other indicating means are possible, for example, filament type lamps may be used directly in series with the counting element to give an indication.

Figure 4:
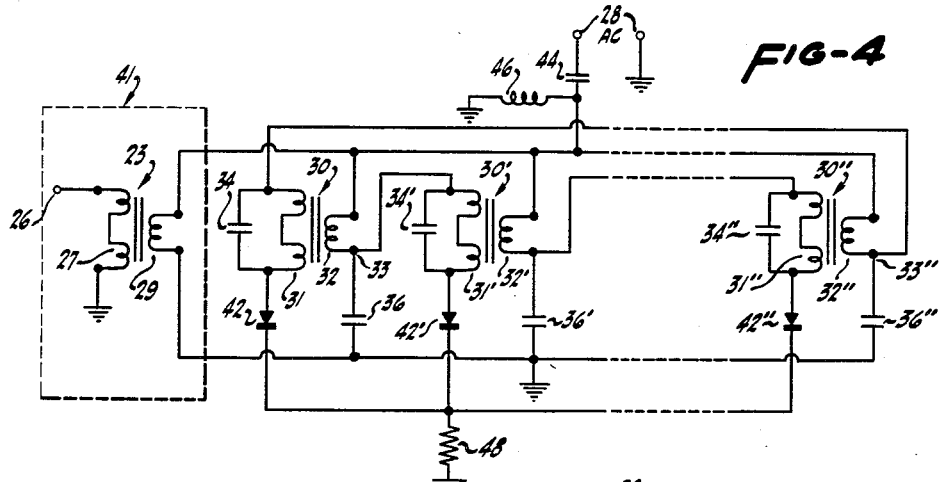
Fig. 4 is a schematic diagram of a preferred embodiment of the invention employing series type counting elements and a parallel pulse input stage.

Turning now to Fig. 4, illustrating another preferred embodiment of the invention, the same numbers have there been used for components which are the same as the like numbered components shown in Fig. 3. In Fig. 4 counting elements comprised of operating winding 32 in series with capacitor 36, and operating winding 32' in series with capacitor 36', etc., are shown connected in parallel. The parallel group of counting elements is connected through a series limiting impedance such as capacitor 44 to a source of A. C. excitation voltage which is applied to terminals 28. Other forms of impedance, such as a resistance, could be used in place of capacitor 44. Furthermore, an impedance such as limiting impedance 44 is unnecessary and the connection may be directly to the A. C. exciting source if said A. C. source has a substantially constant current characteristic. Inductance 46 is an R. F. choke designed to afford a D. C. return to ground but offers high impedance to the A. C. excitation voltage. In Fig. 4, the input stage 41 comprised of saturable reactor 23 is connected in parallel with the group of counting elements. Inductance 46 is accordingly unnecessary where saturable reactor 23 will conduct the D. C. currents involved without any appreciable saturation. Other forms of input circuits arranged to offer low impedance upon the input of each pulse may be used, such as a vacuum tube or a biased diode with appropriate circuitry known to the art. In a number of these forms inductance 46 is indispensable. Connected to a point within each counting element such as the junction 33 of operating winding 32 and capacitor 36 is a memory circuit comprised of control winding 31 and capacitor 34 connected in parallel, and the parallel combination connected through a non-linear impedance such as diode 42 to a source of reference potential or ground. An impedance such as resistor 48 is included to decrease the loading on the memory circuits, which loading might otherwise cause counting without any pulse input due to excessive saturation of the control windings.

Pulses to be counted are introduced on terminal 26 which is connected through control winding 27 of saturable reactor 23 to ground or is otherwise returned to the pulse source. Operating winding 29 of saturable reactor 23 is connected directly in parallel with the counting elements.

The operation of the circuit of Fig. 4 is similar to the operation of the circuit of Fig. 3 as explained hereinabove except for the action of the input stage 41. In the circuit of Fig. 4 pulses are introduced upon terminal 26 and flow through control winding 27 of saturable reactor 23 to ground or are otherwise returned to the pulse source. These pulses result in the temporary saturation of saturable reactor 23 and a consequent reduction of the inductance of the operating winding 29. Operating winding 29 then offers relatively low impedance, effectively amplifying the effect of the input pulses, and the decreased impedance causes an increase of current through limiting capacitor 44. Consequently, the A. C. excitation voltage drop across capacitor 44 increases. This results in a lower A. C. excitation voltage on the parallel counting elements, tending to return all such elements to their low current state. In addition, the counting elements having current flow in their associated memory circuits will tend to be returned to their low current states due to the damping effect of their reduced impedance. The counting element or elements having a D. C. current in their control windings 31, 31', etc., will be the counting element or elements with the lowest firing voltage and these counting elements will go into their high current state upon the termination of the pulse which was introduced upon terminal 26. The counting element or elements which will have such a D. C. current in their control winding will be the elements following elements previously in the high current state, due to the discharge of the current stored in the corresponding capacitors 34, 34', 34'', etc., as already described hereinabove.

Figure 5:
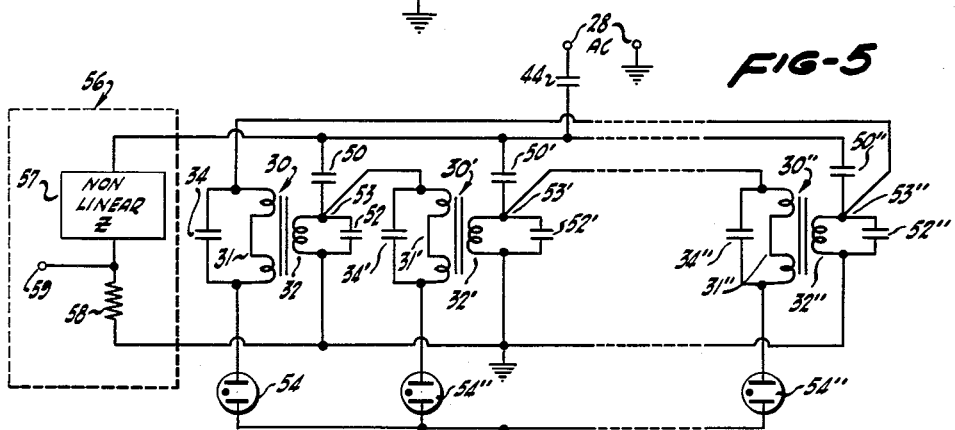
Figs. 5 and 6 are schematic diagrams of other embodiments of the invention.

Referring now to Fig. 5, which illustrates another embodiment of the invention, the counting elements therein depicted are of the parallel connected type. These counting elements are comprised of a saturable reactor winding 32 in parallel with a capacitor 52, and the parallel combination connected in series with a sensing impedance such as capacitor 50. Similar counting elements are shown comprised of winding 32', capacitor 52' and capacitor 50', etc., and all the counting elements are connected in parallel. A memory circuit is connected to some point within each counting element, such as the junction 53 of sensing capacitor 50 and the parallel counting element, said memory circuit being comprised of capacitor 34' in parallel with control winding 31' of the next succeeding saturable reactor 30' and a non-linear impedance such as neon light 54' in series with said parallel combination. A source of D. C. voltage is connected at terminal 55 to permit energizing neon light 54'; with forms of non-symmetrical non-linear impedance other than neon light 54 terminal 55 might be returned to ground. Symmetrical non-linear impedances may also be used in place of neon light 54', but require an appropriate bias. The A. C. excitation voltage is applied to terminals 28 and through a limting impedance such as capacitor 44 to the parallel group of counting elements. Connected in shunt with the parallel group of counting elements is an input stage 56 comprised of a non-linear impedance element 57 such as, for example, a thyrite unit, in series with a second impedance such as resistor 58. If a non-symmetrical non-linear impedance such as a diode were used in place of symmetrical non-linear impedance 57, a bias connected to such impedance may be necessary.

The frequency and amplitude of the A. C. excitation voltage applied to terminals 28 is chosen so that a predetermined number of counting elements will be in their low current state, the term "low current state" being used here in the same sense as in Fig. 2 hereinabove, i. e., low current through capacitor 50, and the remaining counting elements will be in their high current state. In typical counting applications, only one counting element will be in the low current state. Either the low current state or the high current state of the parallel type counting element may be chosen for the indicating state, but where neon lights are employed as non-linear impedance elements in the memory circuits, as shown, it is convenient to use the low current state as the indicating state, since in this state a higher A. C. voltage will appear across the parallel combination of winding 35 and capacitor 52, which higher voltage may be used to light the neon lamp 54' and cause it to serve the additional function of indicating the condition of the counting circuit. The A. C. excitation voltage is insufficient to cause more than the predetermined number of elements to be in their low current state.

For the purposes of the discussion that follows, it will be assumed that the counting element comprised of capacitor 52 in parallel with operating winding 32 is in its low current or indicating state, and that the remaining counting elements are in their high current state.

Saturable reactor 30 is accordingly in its saturated state and the circuit comprised of operating winding 32 and capacitor 52 is at or near resonance, offering high impedance. The A. C. voltage appearing at junction 53 is accordingly higher than the A. C. voltage appearing at corresponding junction points 53', 53", etc. This causes a high A. C. voltage to be impressed upon the memory circuit comprised of control winding 31', capacitor 34' and neon light 54'. The D. C. voltage impressed upon terminal 55 is chosen so that the higher value of superposed A. C. causes neon light 54' to fire and a D. C. current flows through control winding 31' as a result.

Pulses to be counted are introduced on terminal 59 and result in a substantial temporary reduction of the impedance offered by non-linear impedance 57 due to the non-linear characteristic of said impedance 57. This causes a lowering of the impedance offered by the combination of non-linear impedance 57 and resistance 58 to the A. C. excitation current, which in turn causes a large A. C. voltage drop across capacitor 44 and a reduction in the A. C. voltage appearing across the parallel combination of counting elements. The A. C. voltage across the particular counting element which includes winding 32 and capacitor 52 is reduced and is no longer sufficient to maintain the saturated condition of saturable reactor 30. Saturable reactor 30 accordingly tends to return to its unsaturated state and counting element comprised of winding 32 and capacitor 52 tends to assume its high current state. During the period of pulse application a D. C. discharge current will have been maintained by capacitor 34' through control winding 31'. This D. C. current will continue to light neon lamp 54' and also will continue to flow through winding 31', which will tend to saturate saturable reactor 30'. Upon the termination of the pulse to be counted on terminal 26 the voltage across the parallel group of counting elements again rises and that counting element having a D. C. current in its control winding will tend to go into the saturated or low current state. Accordingly the counting element comprised of winding 32 and capacitor will return to its high current or non-indicating state, extinguishing neon light 54' and the counting element comprised of winding 32' and capacitor 52' will assume its low current or indicating state, lighting the neon light in the next succeeding memory circuit. In a similar manner further pulses cause the indicating condition to progress and the associated neon lamps to light.

Figure 6:
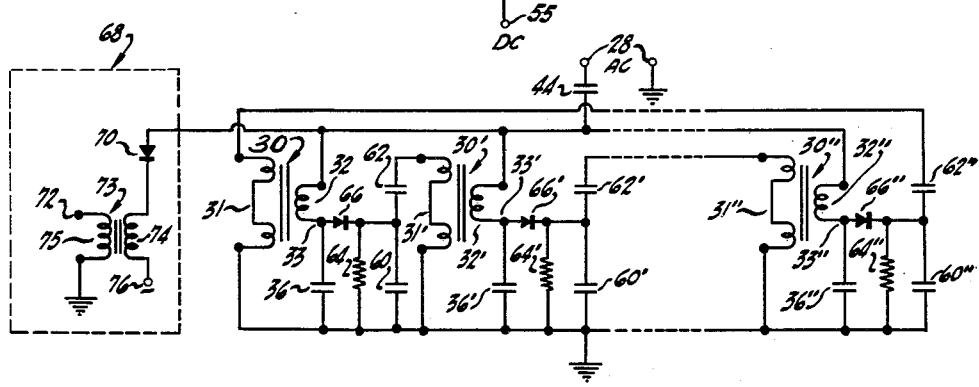

Fig. 6 depicts an embodiment of the invention wherein somewhat different forms of memory and input systems are employed. In the ferro-resonant ring counter of Fig. 6 the counting elements comprised of operating winding 32 in series with capacitor 36 and operating winding 32' in series with capacitor 36', etc., are connected in parallel as in Figs. 3 and 4. Connected to a point within each such counting element, such as the junction 33 of operating winding 32 and capacitor 36, is a non-linear impedance element such as diode 66. Capacitor 60 is arranged in parallel with resistor 64 and the parallel combination is arranged in series with diode 56 so that capacitor 60 charges to the peak A. C. voltage appearing at the point of memory circuit connection 33. Connected also to the parallel combination of capacitor 60 and resistor 64 is capacitor 62 and control winding 31' in series arrangement. A similar connection is made for the other counting elements, e. g., diode 66', resistor 64', capacitors 60' and 62', and a control winding not shown. Input stage 68 is comprised of a non-linear impedance such as diode 70 in series with the secondary winding 74 of a transformer 73. An input terminal 72 is connected via primary 75 of transformer 73 to ground. The bias on terminal 76 as shown is negative, but positive may be used by merely reversing the connections to diode 70 and the polarity of input pulses.

Pulses to be counted are introduced upon terminal 72 and flow through primary 75 of transformer 73 to ground. These pulses result in a voltage appearing across the secondary 74 in opposition to the bias introduced on terminal 76, and this voltage is arranged to have a magnitude such that diode 70 is rendered conductive during part or all of the A. C. excitation voltage cycle while each input pulse is being applied. Consequently, low impedance is offered to the A. C. excitation voltage by the series combination of diode 70 and secondary 74, causing an increase in A. C. voltage drop across series capacitor 44 and a decrease in the A. C. voltage across the parallel counting elements. This tends to return all the counting elements to their low current states.

Assuming that the counting element comprised of the operating winding 32 and capacitor 36 is in its high current state, and that all other counting elements are in their low current states, the capacitor 60 will have assumed a charge greater than the other capacitors 60' and 60" due to the higher A. C. voltage appearing at diode 66. Upon the removal of the A. C. excitation, capacitors 60 and 62 will discharge through resistance 64. Resistance 64 is of a high value, however, and hence the main discharge current will flow through capacitor 62 and control winding 31'. This current flow will be D. C. and will result in partial saturation of saturable reactor 30'.

Upon the termination of the pulse to be counted the A. C. voltage across the parallel counting elements will again rise and that counting element having a D. C. current in its control winding will have the lowest firing voltage, as discussed hereinabove, and accordingly will be the counting element which will go into its high current state. The counting element comprised of winding 32' and capacitor 36' will accordingly go into its high current state. The time constants are arranged to maintain the memory current during the time that diode 70 is conducting.

Other connections and components within the spirit and scope of this invention will be apparent to those skilled in the art from the figures and description herein, and the above description is meant to be illustrative only of preferred embodiments and the invention limited only insofar as it is limited by the following claims:

I claim:

1. A ring counter comprising a plurality of bistable reactive counting elements, connections for applying an alternating exciting voltage simultaneously to all of said elements, means for limiting the current flowing in said elements as a result of such voltage, an input stage operative in response to pulses to be counted to reduce the voltage applied to said counting elements to tend to cause all to assume the same one stable state, and a plurality of memory circuits interconnected respectively between each two successive counting elements, each of said memory circuits being operative when the leading one of such two counting elements is in its other stable state to bias the following one of such two counting elements toward said other stable state and so cause it to assume said other state when the alternating voltage is restored.

2. A pulse registering circuit comprising a plurality of reactive bistable elements connected in a closed loop, each of said bistable elements having only a high-current state and a low-current state, connections for applying an alternating voltage simultaneously to said bistable elements, means to limit the number of said bistable elements which assume the high-current state, the remaining said elements necessarily assuming the low-current state, a pulse input stage for reducing said alternating voltage on all said bistable elements during at least a portion of each pulse to be registered, and a plurality of memory circuits interconnected respectively between each two successive bistable elements, each said memory circuit including a storing impedance associated with the leading bistable element and a control means associated with the following bistable element, said storing impedance causing operation of said control means during the reduction of said alternating voltage, whereby the current state of each said bistable element is transferred by each pulse to be registered.

3. A ring counter comprising a plurality of counting elements connected in parallel, each of said counting elements having only a stable high-current condition and a stable low-current condition and including an inductor having a saturable core and a capacitor, connections for applying an alternating potential to said counting elements, a series impedance for limiting the number of said counting elements which can assume the stable high-current condition, a pulse input stage for reducing said alternating potential on said counting elements during at least a portion of each pulse to be counted, and a plurality of memory circuits, each said memory circuit being connected to a point within a leading counting element and including a non-linear impedance, a capacitor and a control winding on the inductor in a following counting element, said capacitor being arranged to become charged through said non-linear impedance when said leading counting element is in one of its stable states and maintain a current in said following control winding during said reduction of alternating potential whereby said stable state is transferred from said leading counting elements to said following counting element after the introduction of each pulse to be counted.

4. A ring counter comprising, in combination, a plurality of counting elements connected in parallel, each of said counting elements including a bistable ferro-resonant circuit, means to apply an alternating potential to said elements including a series impedance, said series impedance limiting the alternating current flowing as a result of said alternating potential through said counting elements so that only one said counting element is in the indicating state, and said series impedance also including at least one component having a variable reactance, means to change the reactance of said component during the application of each pulse to be counted so that said series impedance forms an anti-resonant circuit at the frequency of said alternating potential thereby reducing said alternating potential on said counting elements, and a plurality of memory circuits, each said memory circuit being connected to a first counting element and including a storing impedance and means to affect a second counting element by the discharge of said storing impedance during said reduction of alternating potential, whereby said indicating state is transferred by each said pulse to be counted.

5. In a ferro-resonant ring counter having a plurality of bistable counting elements and a memory circuit connecting respectively each said bistable counting element to the next succeeding bistable counting element, connections for applying an alternating potential to said counting elements including a common limiting impedance, said common limiting impedance comprising a capacitor and one winding of an inductor with a saturable core, means including a second winding on said inductor to change the inductance thereof during each pulse so that a parallel resonant circuit is formed by said limiting impedance at the frequency of said alternating potential, whereby the alternating potential across said counting elements drops in value during each pulse allowing said memory circuit to function to transfer the stable condition from each counting element to the next succeeding counting element.

6. A pulse counting circuit comprising a plurality of bistable elements connected to form a closed ring, each said bistable element including a saturable reactor and a capacitance, means including connections for applying an alternating potential whereby a selected number of said bistable elements are caused to be in a high-current condition and the remaining number of said bistable elements are caused to be in a low-current condition, a pulse input stage comprising an input saturable reactor having an operating winding connected in shunt with said bistable elements and a control winding connected to the pulse source for reducing said alternating potential on said bistable elements during each pulse to be counted, and a plurality of memory circuits, each said memory circuit being connected to a first bistable element and including a capacitor, a non-linear impedance for causing said capacitor to accumulate electric energy, and a control winding on the saturable reactor in a second bistable element, said energy accumulated in said capacitor discharging through said winding to cause said memory effect during said reduction of alternating potential.

7. In a ring counter having a plurality of reactive counting elements and a memory circuit connected between each such counting element and the next succeeding counting element, connections for applying an alternating potential to said elements, including an impedance in series arrangement, said impedance being of a value which allows only a selected number of such counting elements to be in the indicating state, and an input stage comprising a saturable reactor having a control winding and an operating winding, said operating winding being connected in parallel with said counting elements and said control winding being connected to a source of pulses whereby said operating winding is caused to decrease its impedance thereby reducing said alternating potential on said counting elements during each such pulse.

8. A ring counter comprising a plurality of counting elements connected in parallel, each of said counting elements having only a stable high-current condition and a stable low-current condition and including an operating winding of a saturable reactor and a capacitor in series arrangement, a circuit including a series impedance for connecting an alternating potential to said counting elements, a pulse input stage including a saturable reactor for reducing said alternating potential on said counting elements during each pulse to be counted, and a plurality of memory circuits, each said memory circuit being connected to the junction of the operating winding and capacitor of a leading counting element and including a parallel circuit comprised of a control winding on the saturable reactor in a following counting element and a capacitor, and a non-linear impedance in series with said parallel circuit, for remembering the condition of said leading counting element and priming said following counting element in accordance therewith, whereby said following counting element is caused to assume the current condition of said leading counting element by each pulse to be counted.

9. An electrical pulse-operated circuit comprising, in combination, a plurality of reactive bistable elements connected in parallel, each of said bistable elements including an operating winding of a saturable inductor and a capacitor, a circuit for connecting an alternating potential to said bistable elements, a series limiting impedance including one winding of an input saturable inductor and a capacitor in parallel therewith, the impedance of said circuit being such that a selected fixed number of said bistable elements assume one stable state and the remaining number of said bistable elements assume the other stable state, means including a saturating winding on said input inductor to introduce pulses to be counted and cause said winding on the input inductor and capacitor in parallel therewith to resonate at the frequency of said alternating potential during the application of a pulse to be counted, reducing the alternating potential on said bistable elements during said pulse, and a plurality of memory circuits, each said memory circuit being connected to the junction of the operating winding and the capacitor in one bistable element, and including a capacitance and a control winding on the saturable reactor in a next succeeding bistable element, said capacitance being arranged to accumulate electric energy when the bistable element to which it is connected is one of the two possible stable states and discharge said energy during said reduction of alternating potential through said control winding, thereby causing the said stable states to be transferred upon the resumption of the alternating potential.

10. A pulse counting circuit comprising a plurality of counting elements, each of said counting elements having only a stable high-current condition and a stable low-current condition, and including an operating winding of a saturable reactor and a capacitor in series arrangement, connections for applying an alternating exciting voltage simultaneously to all of said counting elements, means for limiting the current flowing in said elements as a result of said voltage, a pulse input stage including a saturable reactor having its operating winding in shunt with said counting elements and a control winding whereon pulses are introduced for reducing said alternating voltage on said counting elements during each said pulse, and a plurality of memory circuits, each said memory circuit being connected to a point within a first counting element and comprising a non-linear charging impedance, a storing capacitor, and the control winding of a second counting element, whereby a high-current condition is transferred by the discharge of said capacitor through said control winding from each counting element in the high-current condition to the respective said second counting elements by each pulse to be counted.

11. A sequentially operated counting circuit comprising a plurality of reactive bistable elements connected in parallel, each of said elements including an inductor having a saturable core and a capacitor connected in parallel therewith, means including connections for a source of alternating potential for energizing said reactive element, a pulse input stage comprising an input inductor having a saturable core, said input indicator having a saturating winding connected to the pulse source and an operating winding arranged to reduce the said alternating potential on said reactive elements during each pulse, and a plurality of memory circuits, each said memory circuit being connected to the inductor in each reactive element, and including a capacitor, a saturating winding on the inductor in the next succeeding reactive element and means for charging said capacitor including a non-linear impedance, and connections for causing the discharge of said capacitor through said saturating winding during the removal of alternating potential.

12. An electrically operated counting circuit comprising a plurality of counting elements connected in parallel, each of said counting elements having only a stable high-current state and a stable low-current state, and including an operating winding of a saturable inductance and capacitor in series arrangement, connections for applying an alternating potential to said counting elements, means including a series limiting impedance for allowing only one such counting element to be in the high current state, the remaining counting elements necessarily being in the low current state, a pulse input stage, said pulse input stage being connected in shunt with said counting elements and comprising a non-linear impedance and a fixed impedance in series arrangement, means to introduce pulses to the junction of said non-linear impedance and fixed impedance reducing said alternating potential on said counting elements, and a plurality of memory circuits interconnected respectively between each two successive counting elements, each such memory circuit comprising a capacitor and a control winding on the saturable inductor of the following counting element in parallel, a non-linear impedance in series therewith, and connections for applying a direct potential to said non-linear impedance.

13. In an electrical pulse operated circuit having a plurality of parallel reactive elements and memory circuits interconnected between each successive pair of said reactive elements, a pulse input means comprising terminals for the connection of an alternating potential, a first impedance arranged in series between one of said terminals and said elements, a second impedance having a symmetrical non-linear impedance characteristic arranged in shunt with said plurality of reactive elements, and means to introduce pulses across said second impedance whereby the proportion of said alternating potential appearing across said plurality of reactive elements is decreased during each said pulse.

No references cited.